United States Patent Office 3,578,709
Patented May 11, 1971

3,578,709
PREPARATION OF ALKALI METAL SALTS OF NITRILOTRIACETIC ACID
John J. Bishop, Northford, Conn., and Albert W. Jache, Wauwatosa, Wis., assignors to Olin Corporation
No Drawing. Filed Aug. 28, 1968, Ser. No. 755,837
Int. Cl. C07c *101/20*
U.S. Cl. 260—534
3 Claims

ABSTRACT OF THE DISCLOSURE

Alkali metal salts of nitrilotriacetic acid are advantageously produced by heating triethanolamine in the presence of a zinc oxide or a cadmium oxide catalyst at 150° to 300° C. with a mixture of sodium hydroxide and a minor proportion of potassium hydroxide.

---

Alkali metal salts of nitrilotriacetic acid find extensive use in detergent compositions and are expected to find increasing use in substitution for phosphates currently used in detergent compositions. The phosphates contribute to pollution problems, especially those related to eutrophication of weeds and lower forms of life.

Alkali metal salts of nitrilotriacetic acid have been prepared by several methods one of which is the alkaline oxidation of triethanolamine according to the question:

$$N(CH_2CH_2OH)_3 + 3MOH \rightarrow N(CH_2COOM)_3 + 6H_2$$

where M is an alkali metal.

According to the equation, the theoretical requirement of caustic alkali is 3 moles per mole of triethanolamine (TEA) and the gas produced is 6 gram moles or about 146 liters at 25° C. and sea level per mole of TEA.

U.S. Pat. 2,384,816 describes the alkaline dehydrogenation of triethanolamine by heating a mixture of 1 mole of triethanolamine, 4 moles of KOH and a small amount of water at 210° to 220° C. for 16 hours. The yield of hydrogen was 38 liters whereas the theoretical yield of hydrogen under standard conditions (0° C. and 760 mm.) is 134.4 liters. The percentage yield cannot have exceeded 38×100/134.4=28.3%. This patent discloses that the hydroxides of sodium and potassium are useful but show little or no difference in this process.

U.S. Pat. 2,384,817 describes the addition of cadmium catalysts to similar reaction mixtures heated at 140° to 300° C. but contains no example specific to triethanolamine. This patent contains no further disclosure than U.S. Pat. 2,384,816 regarding the nature of the alkali metal hydroxide used.

Investigation has shown, as described in Example V, that potassium hydroxide is particularly advantageous in producing high yields of the described salt of nitrilotriacetic acid (KNTA) without any appreciable quantity of the usual by-product salt of hydroxyethyl-iminodiacetic acid (KHEIDA). In contrast, sodium hydroxide, as shown by Example IV, gave low yields of the desired sodium salt (SNTA) and increased yields of the by-product (SHEIDA).

In the commercial production of these salts, the use of KOH raises the cost of the salt, in spite of the high yield because of the high cost of KOH compared to NaOH. Surprisingly, it has now been found that the cost of the desired product can be materially reduced by using a mixture of alkalies containing a major proportion of sodium hydroxide and a minor proportion of potassium hydroxide. Suitably the proportion of potassium hydroxide on a molar basis is from 0.5 to 15% and, with especial advantage, from 5 to 10% based on the sodium hydroxide. The minor proportion of KOH produces yields almost as advantageous as with KOH alone at a cost little more than that of NaOH alone. This advantage is critical to the production of SNTA in commercial quantities at low cost and makes the difference between successful commercial production and failure. For this reason, the improvement of this invention is a significant advance in the art of manufacture of nitrilotriacetic acid salts.

EXAMPLE I

A mixture of 1.8 g. (0.015 mole) of cadmium oxide, 14.92 g. (0.1 mole) of triethanolamine, 2 ml. of water, 2.53 g. (0.04 mole) of KOH pellets and 16.6 g. (0.4 mole) of NaOH pellets was heated under reflux for 8.5 hours at 166° to 224° C. until the evolution of hydrogen was substantially complete. The reaction mixture was taken up in water, filtered and the filtrate was evaporated to dryness. The solid was extracted several times with ethanol and the solid was dried in a vacuum oven. The solid product contained 91% of the sodium salt of nitrilotriacetic acid (SNTA) and 9% of the sodium salt of hydroxyethyl-iminodiacetic acid (SHEIDA) and amounted to 24.51 g. Conversion to SNTA was 86.5% and to SHEIDA was 9.1%.

EXAMPLE II

The procedure of Example I was repeated except that the temperature of heating was 168° to 218° C. and the time of heating was 15.0 hours. Conversion to SNTA was 83.6% and to SHEIDA was 13.9%, fairly reproducing the results of Example I.

EXAMPLE III

The procedure of Example I was repeated except that the amount of KOH was reduced to 0.17 g. (0.003 mole). The temperature of heating was 160° to 240° C. and the time of heating was 7 hours. Conversion to SNTA was 70.7% and to SHEIDA was 21.6%. Even as small a proportion of KOH as used in this example was an improvement over NaOH alone as shown in Example IV.

EXAMPLE IV

The procedure of Example I was repeated but the KOH was omitted for comparison. The amount of CdO catalyst was increased to 5.4 g. (0.045 mole). The temperature of heating was 160° to 248° C. and the time of heating was 13.5 hours. Conversion to SNTA was 20.0% and to SHEIDA was 11.6%. The increased amount of catalyst had no salutary effect and the yield of SNTA was extremely poor.

EXAMPLE V

For comparison, the procedure of Example I was repeated using 0.4 mole of KOH and no NaOH. The temperature of heating was 164° to 241° C. and the time of heating was 6 hours. Conversion to KNTA was 97% and no KHEIDA was detected in the product.

EXAMPLE VI

The procedure of Example I was repeated substituting the same molar proportion of zinc oxide for the cadmium oxide used as catalyst. The temperature of heating was 164° to 228° C. and the time of heating was 14.0 hours. The yield of the salt of NTA was 77.3% and of HEIDA was 13.5%.

What is claimed is:

1. In the method of preparing alkali metal salts of nitrilotriacetic acid by heating a mixture of triethanolamine, a catalyst and an alkali metal hydroxide, the improvement in which said alkali metal hydroxide consists of a major proportion of sodium hydroxide and a minor proportion of potassium hydroxide, said catalyst is selected from the group consisting of zinc oxide and cadmium oxide and said mixture is heated at a temperature of 150° to 300° C.

2. Method as claimed in claim 1 in which the proportion of potassium hydroxide is from 0.5 to 15% based on the sodium hydroxide.

3. Method as claimed in claim 2 in which said proportion of potassium hydroxide is from 5 to 10% based on the sodium hydroxide and said catalyst is cadmium oxide.

References Cited

UNITED STATES PATENTS

| 2,384,818 | 9/1945 | Curme et al. | 260—534E |
| 2,384,817 | 9/1945 | Chitwood | 260—534E |
| 2,384,816 | 9/1945 | Curme et al. | |

LEWIS GOTTS, Primary Examiner

J. L. DAVISON, Assistant Examiner